2 Sheets—Sheet 1.

J. SMITH & J. COURSE.
Machine for Trimming Beveled Gears.

No. 228,687. Patented June 8, 1880.

Witnesses.

John Smith & Josiah Course
Inventors.
By Atty.

N. PETERS, PHOTO-LITHOGRAPHER, WASHINGTON, D. C.

2 Sheets—Sheet 2.

J. SMITH & J. COURSE.
Machine for Trimming Beveled Gears.

No. 228,687. Patented June 8, 1880.

UNITED STATES PATENT OFFICE.

JOHN SMITH AND JOSIAH COURSE, OF CARSHALTON, ENGLAND.

MACHINE FOR TRIMMING BEVELED GEARS.

SPECIFICATION forming part of Letters Patent No. 228,687, dated June 8, 1880.

Application filed May 27, 1878.

*To all whom it may concern:*

Be it known that we, JOHN SMITH and JOSIAH COURSE, of Carshalton, in the county of Surrey and Kingdom of England, have invented certain new and useful Improvements in Machinery or Apparatus for Trimming Bevel and other Gearing; and we do hereby declare that the following is a full, clear, and exact description of the same.

The object of this invention is the construction of machinery or apparatus for trimming bevel and other toothed wheels arranged and working in the case of bevel-wheels, so as to traverse a cutter in the direction of a radial line passing horizontally through a vertical line at a point coincident with the point or apex of the angle-cone of the bevel to be trimmed, and also to raise and lower vertically the traversing cutter, to follow the epicycloidal or hypocycloidal curve of the teeth.

For spur-gear the arrangement for adjustment of the cutter to the required curve of the teeth is employed and the cutter traversed in the direction of a horizontal line parallel to the longitudinal central axis of the machine; and for skew-gear the cutter will be traversed in an oblique direction to the center line.

In order that the invention may be well understood there is annexed hereto two sheets of drawings, the same being marked with figures and letters of reference, like letters referring to the same parts in all the figures.

Figure 1:
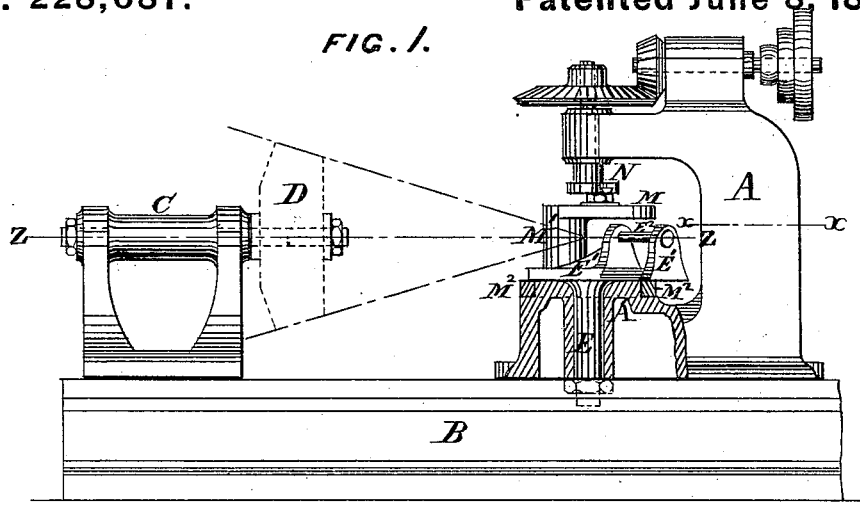
Figure 2:
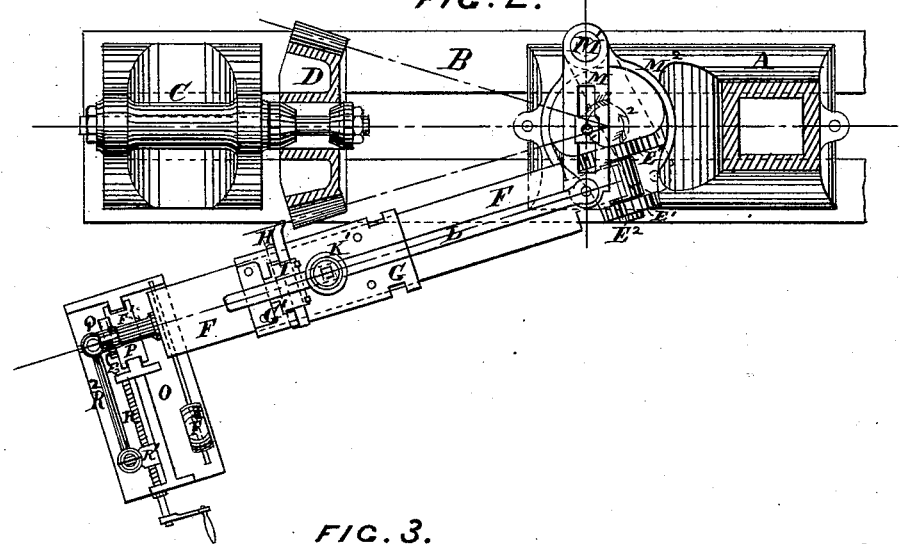
Figure 3:
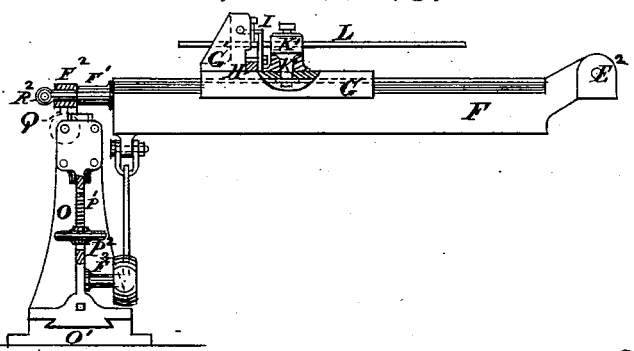
Figure 4:
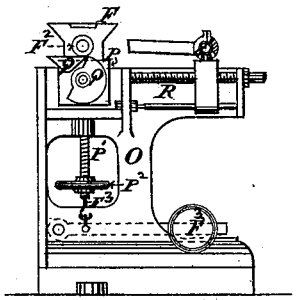
Figure 5:
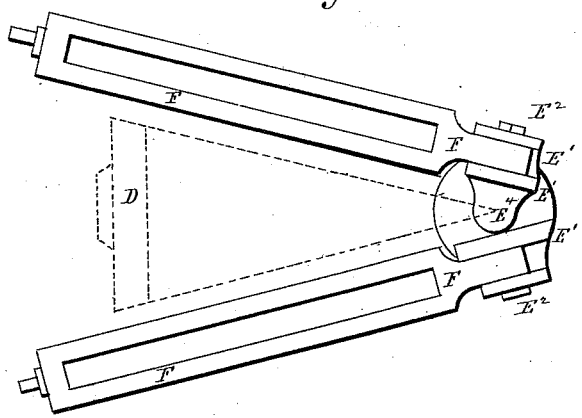
Figure 5A:
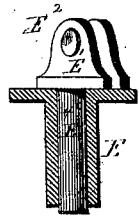

Figure 1 is a side elevation, partly in section, with slide-arm carrying the cutter removed; Fig. 2, a plan with top of main bearing-bracket removed or cut away at line $x\ x$ of Fig. 1, and showing link-driving motion; Fig. 3, side view, detached, of slide-arm for carrying cutter; Fig. 4, end view of bracket carrying the outer end of slide-arm and showing arrangement of cam-plates for raising vertically the cutter to follow the curve of the teeth. Fig. 5 is a plan representing the arrangement of two radial brackets and two slide-arms, to allow of trimming both sides of a wheel at the same time. Fig. 5ª is a longitudinal central section of the radial brackets shown in Fig. 5.

The apparatus consists of a standard or main bearing-bracket, A, either capable of sliding upon or fixed to a bed-plate, B, such as the bed of an ordinary lathe, and in line longitudinally with the axial line Z Z of the lathe-head C, to which the wheel D (shown in broken lines, Fig. 1, and section, Fig. 2) to be trimmed, is chucked. Either or both the bearing-bracket A and the chuck-head C are to be capable of adjustment in a longitudinal direction.

In the said main bearing-bracket A is turned out vertically (and intersecting the longitudinal axial line Z Z) a hole for the reception of a strong center stud, E, carrying a radial bracket, E', which radial bracket is free to turn or radiate horizontally upon said center stud, and on the said main bearing-bracket, around the said vertical hole, is formed a recess or flange, A', for purpose hereinafter described. The radial bracket is of required form for the reception of one end of a slide-arm, F, which said slide-arm is secured to the radial bracket by a bolt or pin, $E^2$, or bearing, on which it is free to radiate in an upward and downward direction.

In guides on or in the said slide-arm works a sliding rest or block G, which carries the trimming or planing tool or cutter H, said tool being secured in a flap-stock, I, or holder similar to the flap-stock of an ordinary planing and shaping machine.

In said sliding rest G is turned out vertically a hole for reception of a stud, K, free to turn, and in the head K' of which said stud or slot is provided for reception and securing of one end of a connecting rod or bar, L, serving to give reciprocating motion to the sliding rest G and trimming-tool H. The other end of the connecting-rod L is, by a double joint and pin or (for trimming skew-gear) universal joint, connected to a slotted link, M, for giving reciprocating motion by adjustable crank or disk N, driven by gearing or band, substantially as in an ordinary shaping-machine; but the fixed center M' of the said link M is carried upon a collar-plate, $M^2$, secured around and capable of adjustment in or on the recess or flange A', before described as being formed on the main standard around or concentric with the hole for the center stud, E, carrying the radial bracket E'.

The outer end of the slide-arm F carries upon a strong stud, F', an anti-friction roller, F², which rests upon or is carried on a stand, bearing, or bracket, O, (shown in detail, Fig. 4,) said bracket O being adjustable on a longitudinal or segmental slide, O', Fig. 3, by screw or any ordinary means for the purpose. This bracket O is also fitted with a vertical slide, P, actuated by screw P' to adjust the outer end of slide-arm F and vertical position of the cutter H, and to said slide P is secured adjustable cam-plates Q, which cam-plates are of the shape or curve to which the teeth are intended to be cut or trimmed — that is, said cams are of the form of sectors of circles or of epicycloidal or hypocycloidal form, and the anti-friction roller F² on the end of the slide-arm F works over the said cam-plates, the slide-arm F being worked horizontally by a screw, R, working through a sliding block, R', or by lever or rack and pinion, and by a universal connecting link or rod, R², either automatically or by hand, as in ordinary manner for the purpose.

Instead of using the cam-plates Q, the vertical slide P may be actuated automatically by train of change-wheels or ratchet and pawl, or by hand-wheel P², to give either the requisite rise or fall of the tool when trimming either up or down the curve of the teeth, as will be well understood; but the cam-plates Q are preferred, and in either case the horizontal action will be given by the means above described.

The anti-friction roller F² on the slide-arm is kept in contact with the cam-plates Q on the top of the vertical slide P by its own weight, or by simple or compound lever and weight F³, as shown, or by springs, when necessary.

For trimming skew-bevel wheels, the outer end of the slide-arm F will be raised or lowered out of the horizontal upon its joint E² on the radial bracket E' to the angle of the skew, and the connecting-rod L for traversing the cutter H will be jointed by universal joint to the slotted link M, for imparting the requisite reciprocating motion. The position of the link at the end of the traverse of the cutter is indicated in dotted lines, Fig. 2, and the path of the driving-crank or eccentric will be in the direction of the arrow and on the small circular line 1 2, thus giving a slow traverse of the cutter H and a quick return-stroke.

When working upon wheels of large dimensions it will be found desirable to trim the same on both sides at the same time, and an arrangement of two radial arms, F, is represented in Figs. 5 and 5ª for this purpose, the only alteration necessary in the arrangement shown in Fig. 1 being to remove the central stud, E, of radial bracket E' and drop therein the stud E⁴ of the second radial bracket, as clearly shown in said Figs. 5 and 5ª.

For actuating the tool which will be carried on the second slide-arm, a second link and connecting-rod will be employed, said second link being coupled to the first link, M, by a rigid brace-piece, so as to drive both cutters from the same motion.

We have here indicated the means for actuating the second cutter, but have not shown same in the drawings, as they will be readily understood by persons practiced in the trade.

For trimming spur-wheels a separate sliding rest, carrying the cutter, will be provided to slide on the slide-arm F—that is, to replace the part G' of the sliding rest G of Figs. 2 and 3; but the sliding arm or arms F will in this case be secured on a joint-pin, as E², so that said slide-arm will be parallel with bed B, and simple reciprocating motion will be communicated as desired or convenient.

The curved shape or form of tooth will be obtained in similar manner to that before described—that is, by roller on cam-plates—the slide-arm F being actuated horizontally by change-wheels or by ratchet and pawl.

We claim as our invention—

In a gear-cutting machine, the combination of the bracket E' on the stud E, the arm F, hung to said bracket, and the cutter-slide G on said arm, substantially as described.

JOHN SMITH.
JOSIAH COURSE.

Witnesses:
E. T. HUGHES,
EDWARD FARRELL.